(12) United States Patent
Tochio et al.

(10) Patent No.: US 12,374,689 B2
(45) Date of Patent: Jul. 29, 2025

(54) NON-AQUEOUS ELECTROLYTE SECONDARY BATTERY

(71) Applicant: Panasonic Intellectual Property Management Co., Ltd., Osaka (JP)

(72) Inventors: Takaya Tochio, Nara (JP); Katsuya Inoue, Hyogo (JP); Takeshi Ogasawara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 593 days.

(21) Appl. No.: 17/764,004

(22) PCT Filed: Jul. 28, 2020

(86) PCT No.: PCT/JP2020/028826
§ 371 (c)(1),
(2) Date: Mar. 25, 2022

(87) PCT Pub. No.: WO2021/065173
PCT Pub. Date: Apr. 8, 2021

(65) Prior Publication Data
US 2022/0393165 A1 Dec. 8, 2022

(30) Foreign Application Priority Data
Sep. 30, 2019 (JP) ................... 2019-179819

(51) Int. Cl.
*H01M 4/525* (2010.01)
*H01M 4/02* (2006.01)
(Continued)

(52) U.S. Cl.
CPC ......... *H01M 4/525* (2013.01); *H01M 4/0404* (2013.01); *H01M 4/505* (2013.01);
(Continued)

(58) Field of Classification Search
CPC .... H01M 4/525; H01M 4/0404; H01M 4/505; H01M 2004/021; H01M 2004/027;
(Continued)

(56) References Cited

U.S. PATENT DOCUMENTS 6,037,095 A    3/2000 Miyasaka
6,468,693 B1   10/2002 Takami et al.
(Continued)

FOREIGN PATENT DOCUMENTS

CN    107742717 A    2/2018
JP    2001-102091 A  4/2001
(Continued)

OTHER PUBLICATIONS

Extended (Supplementary) European Search Report dated Oct. 7, 2022, issued in counterpart EP application No. 20873084.6. (11 pages).

(Continued)

*Primary Examiner* — Daniel S Gatewood
(74) *Attorney, Agent, or Firm* — WHDA, LLP

(57) ABSTRACT

This positive electrode has a positive electrode collector and a positive electrode mixture layer formed on the surface of the positive electrode collector. The positive electrode mixture layer contains a lithium transition metal composite oxide containing 85 mol % or more of Ni and 1-15 mol % inclusive of Al relative to the total number of moles of metal elements other than Li, and in which the total amount of Ni, Al, and Mn contained is 99.9 mol % or more. The density of the positive electrode active material in the positive electrode mixture layer is 3.45 g/cm³ or higher. In an observation of a cross-section of the positive electrode using a scanning electron microscope, the proportion of the cross-section area of the lithium transition metal composite oxide devoid of cracks relative to the cross-section area of the lithium (Continued)

transition metal composite oxide exposed on the cross-section is 51% or higher.

9 Claims, 2 Drawing Sheets

(51) Int. Cl.
H01M 4/04 (2006.01)
H01M 4/505 (2010.01)
(52) U.S. Cl.
CPC .......................... H01M 2004/021 (2013.01); H01M 2004/027 (2013.01); H01M 2004/028 (2013.01)
(58) Field of Classification Search
CPC ........... H01M 2004/028; H01M 4/131; H01M 10/052; Y02E 60/10
See application file for complete search history.

(56) References Cited

U.S. PATENT DOCUMENTS

| | | | |
|---|---|---|---|
| 2008/0206650 | A1 | 8/2008 | Kim et al. |
| 2016/0181601 | A1* | 6/2016 | Usui ................ H01M 10/0525 252/182.1 |
| 2017/0092955 | A1 | 3/2017 | Ashizawa et al. |
| 2017/0141384 | A1 | 5/2017 | Kawakita et al. |
| 2017/0141391 | A1* | 5/2017 | Jito ....................... H01M 4/525 |
| 2017/0155139 | A1 | 6/2017 | Feng et al. |
| 2019/0051935 | A1* | 2/2019 | Okamoto ................ H01M 4/70 |
| 2019/0131618 | A1* | 5/2019 | Hirose ................ H01M 4/366 |
| 2019/0319261 | A1 | 10/2019 | Uchiyama et al. |

FOREIGN PATENT DOCUMENTS

| | | | |
|---|---|---|---|
| JP | 2004356092 A | * | 12/2004 |
| JP | 2008-124038 A | | 5/2008 |
| JP | 2008-210767 A | | 9/2008 |
| JP | 2015-122269 A | | 7/2015 |
| JP | 2016-91762 A | | 5/2016 |
| JP | 2017-183121 A | | 10/2017 |
| JP | 2017-188466 A | | 10/2017 |
| JP | 2017-216149 A | | 12/2017 |
| JP | 2018-67549 A | | 4/2018 |
| JP | 2019140054 A | * | 8/2019 |
| WO | 2015/012086 A1 | | 1/2015 |
| WO | 2015/186752 A1 | | 12/2015 |
| WO | 2016/017093 A1 | | 2/2016 |
| WO | 2016/031147 A1 | | 3/2016 |
| WO | 2017/208624 A1 | | 12/2017 |
| WO | 2018/101072 A1 | | 6/2018 |

OTHER PUBLICATIONS

Kim et al., "Electrochemical Properties of LiNi1—yAlyO2 Cathode Materials Synthesized by Emulsion Method", Journal of the Ceramic Society of Japan, 2007, vol. 115, No. 1340, pp. 245-249, cited in EP Extended European Search Report dated Oct. 7, 2022. (5 pages).
International Search Report dated Oct. 13, 2020, issued in counterpart International application No. PCT/JP2020/028826, with English translation. (11 pages).

* cited by examiner

NON-AQUEOUS ELECTROLYTE SECONDARY BATTERY

CROSS-REFERENCE TO RELATED APPLICATIONS

This application is a National Phase Application filed under 35 U.S.C. § 371 of International Application No. PCT/JP2020/028826 filed on Jul. 28, 2020 which claims the benefit of priorities under 35 U.S.C. § 119(a) of Japanese Patent Application No. 2019-179819 filed in Japan on Sep. 30, 2019, the contents of which are incorporated herein by reference.

TECHNICAL FIELD

The present disclosure relates to a non-aqueous electrolyte secondary battery.

BACKGROUND ART

In recent years, non-aqueous electrolyte secondary batteries comprising positive electrodes, negative electrodes, and non-aqueous electrolytes and being charged and discharged by moving lithium ions, etc., between the positive electrodes and the negative electrodes, have been widely used as secondary batteries having high output and high capacity. Since the secondary battery is repeatedly charged and discharged, improvement on charge/discharge cycle characteristics has been required.

For example, Patent Literature 1 discloses a lithium-ion secondary battery having improved charge/discharge cycle characteristics, etc., by including two types of positive electrode active materials having different particle sizes and including Co in the positive electrode. Moreover, Patent Literature 2 discloses a lithium-ion secondary battery having improved charge/discharge cycle characteristics, etc., by comprising an electrolyte including a lithium/imide-based compound and a positive electrode including a positive electrode active material including Co.

CITATION LIST

Patent Literature

PATENT LITERATURE 1: Japanese Unexamined Patent Application Publication No. 2017-188466
PATENT LITERATURE 2: Japanese Unexamined Patent Application Publication No. 2008-210767

SUMMARY

Patent Literatures 1 and 2 disclose a positive electrode active material including Co, and for the lithium transition metal composite oxide included in the positive electrode active material, a design of decreasing a Co content for reducing a manufacturing cost while increasing a Ni content in order to obtain a high battery capacity, can be accommodated. However, in a high Ni content-lithium transition metal composite oxide that is substantially free of Co, when compressing a positive electrode to increase a density of the positive electrode active material, cracks occur in the positive electrode active material, resulting in that charge/discharge cycle characteristics may be deteriorated, and the battery resistance may also become high.

The non-aqueous electrolyte secondary battery that is one aspect of the present disclosure comprises a positive electrode, a negative electrode, and a non-aqueous electrolyte. It is characterized in that the positive electrode has a positive electrode current collector and a positive electrode mixture layer formed on a surface of the positive electrode current collector, a positive electrode active material included in the positive electrode mixture layer includes a lithium transition metal composite oxide containing 85 mol % or more of Ni and 1 mol % or more and 15 mol % or less of Al, and having a total content of Ni, Al, and Mn of 99.9 mol % or more, with respect to a total number of moles of metal elements excluding Li, a density of the positive electrode active material in the positive electrode mixture layer is 3.45 g/cm$^3$ or more, and in scanning electron microscope observation of a cross section of the positive electrode, a proportion of a cross sectional area of the lithium transition metal composite oxide without cracks to a cross sectional area of the lithium transition metal composite oxide exposed in the cross section is 51% or more.

According to the positive electrode active material for the non-aqueous electrolyte secondary battery that is one aspect of the present disclosure, battery resistance may be smaller while inhibiting reduction in battery capacity accompanying charge/discharge of the secondary battery.

DESCRIPTION OF EMBODIMENTS

A lithium transition metal composite oxide that is included as a positive electrode active material in a positive electrode of a secondary battery, may generate cracks when compressing the positive electrode in order to increase a density of the positive electrode active material. If cracks occur in the lithium transition metal composite oxide, a conductive path cannot be taken inside the lithium transition metal composite oxide to produce a portion incapable of contributing to charge/discharge, which may reduce a battery capacity. Moreover, if cracks are generated in the lithium transition metal composite oxide, an area in contact with a conductive agent decreases, which may allow a battery resistance to increase. Even in this case, a lithium transition metal composite oxide that is a lithium transition metal composite oxide including Co, can reduce an effect of resistance increase due to cracks because Co has high electronic conductivity. However, in the case of decreasing a content of Co in order to reduce a manufacturing cost while increasing a content of Ni in order to obtain a high battery capacity, it is necessary to inhibit a decrease in charge/discharge cycle characteristics and an increase in battery resistance. The present inventors have found, as a result of diligent investigation of the issues concerned, that by adjusting a composition of a positive electrode active material having a high Ni content and free of Co to a specific composition then to increase a particulate strength, deterioration of charge/discharge cycle characteristics and increase in battery resistance, can be inhibited.

An example of the embodiment of the non-aqueous electrolyte secondary battery according to the present disclosure will be described in detail below. In the following, a cylindrical battery in which a wound electrode assembly is housed in a cylindrical battery case is illustrated, however, the electrode assembly is not limited to the wound type, and a plurality of positive electrodes and a plurality of negative electrodes may be alternately stacked one by one with separators interposed therebetween. Further, the battery case is not limited to a cylindrical shape, and may be, for example, a square shape, or a coin shape, or may be a battery case formed of a laminated sheet including a metal layer and a resin layer.

Figure 1:
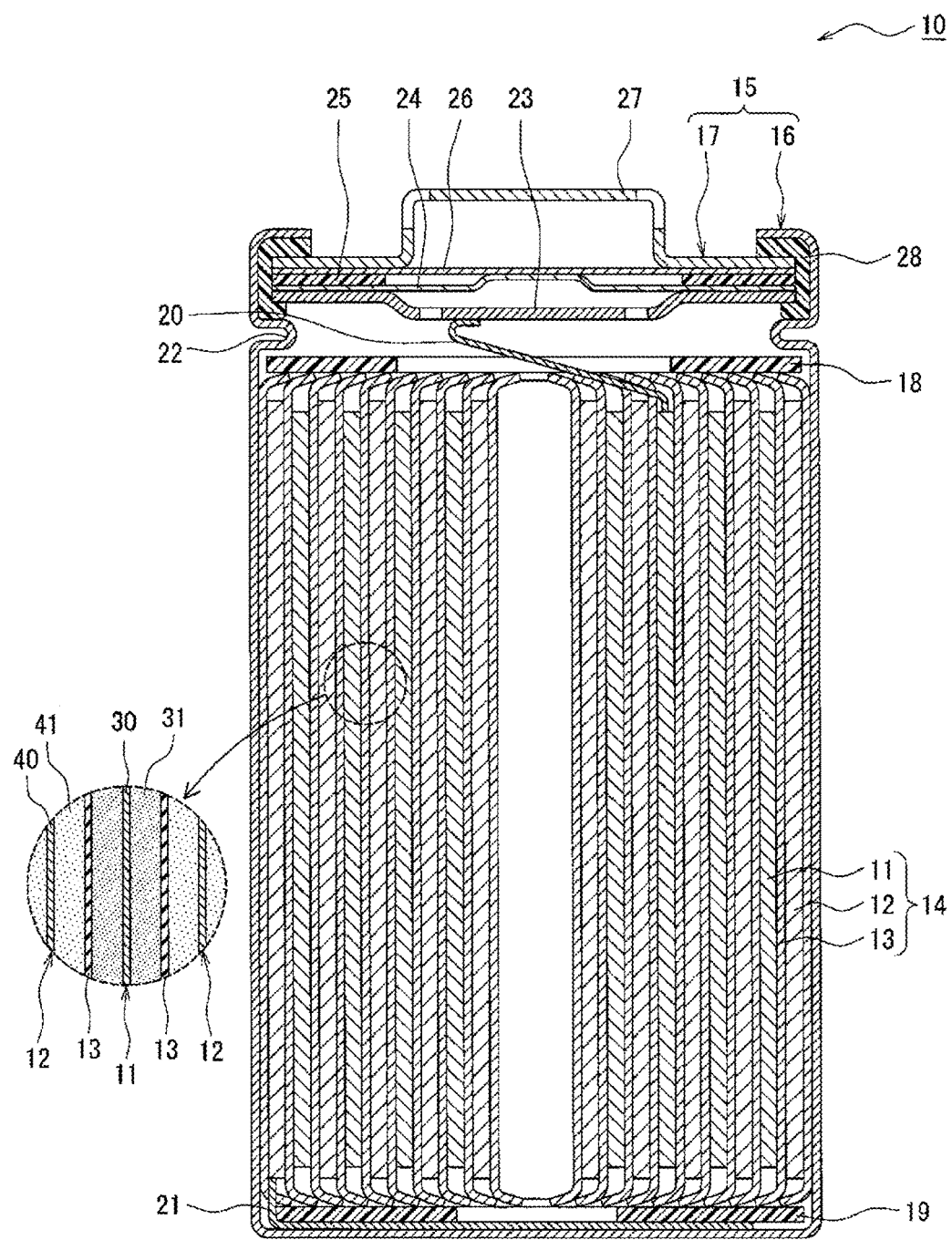
FIG. 1 is a longitudinal sectional view of the non-aqueous electrolyte secondary battery according to an example of an embodiment.

FIG. 1 is a longitudinal sectional view of a non-aqueous electrolyte secondary battery 10 according to an example of an embodiment. As illustrated in FIG. 1, non-aqueous electrolyte secondary battery 10 comprises an electrode assembly 14, a non-aqueous electrolyte (not shown), and a battery case 15 that houses electrode assembly 14 and the non-aqueous electrolyte. Electrode assembly 14 has a wound structure in which a positive electrode 11 and a negative electrode 12 are wound via a separator 13. Battery case 15 is composed of a bottomed cylindrical outer can 16 and a sealing assembly 17 that clogs up the opening of an outer can 16.

Electrode assembly 14 is composed of long positive electrode 11, long negative electrode 12, two long separators 13, a positive electrode tab 20 joined to positive electrode 11, and a negative electrode tab 21 joined to negative electrode 12. Negative electrode 12 is formed to have a size one size larger than that of positive electrode 11 in order to prevent lithium from precipitation. Namely, negative electrode 12 is formed longer than positive electrode 11 in the longitudinal direction and the width direction (short direction). Two separators 13 are formed to have sizes at least one size larger than a size of positive electrode 11, and are arranged to sandwich positive electrode 11, for example.

Non-aqueous electrolyte secondary battery 10 comprises insulating plates 18 and 19 arranged above and below electrode assembly 14, respectively. In the example shown in FIG. 1, positive electrode tab 20 attached to positive electrode 11 extends to the sealing assembly 17 side through the throughhole of insulating plate 18, and negative electrode tab 21 attached to negative electrode 12 passes through the outside of insulating plate 19 and extends to the bottom side of outer can 16. Positive electrode tab 20 is connected to the lower surface of a bottom plate 23 of sealing assembly 17 by welding or the like, and a cap 27 of sealing assembly 17 electrically connected to bottom plate 23 serves as a positive electrode terminal. Negative electrode tab 21 is connected to the inner surface of the bottom of outer can 16 by welding or the like, and outer can 16 serves as a negative electrode terminal.

Outer can 16 is, for example, a bottomed cylindrical metal container. A gasket 28 is arranged between outer can 16 and sealing assembly 17, and seals the internal space of battery case 15. Outer can 16 has a grooved portion 22 that supports sealing assembly 17, which is formed by pressing, for example, the side surface portion from the outside. Grooved portion 22 is preferably formed in an annular shape along the circumferential direction of outer can 16, and supports sealing assembly 17 on the upper surface of the grooved portion.

Sealing assembly 17 has a structure in which bottom plate 23, a lower vent member 24, an insulating member 25, an upper vent member 26, and cap 27 are stacked in this order from the electrode assembly 14 side. Each member constituting sealing assembly 17 has, for example, a disk shape or a ring shape, and each member except insulating member 25 is electrically connected to each other. Lower vent member 24 and upper vent member 26 are connected to each other at the central portion thereof, and insulating member 25 is interposed between the peripheral portions of each member. When the internal pressure of the battery rises due to abnormal heat generation, lower vent member 24 is deformed and broken so as to push upper vent member 26 toward the cap 27 side, and the current path between lower vent member 24 and upper vent member 26 is cut off. When the internal pressure further rises, upper vent member 26 is broken and a gas is discharged from the opening of cap 27.

Hereinafter, positive electrode 11, negative electrode 12, separator 13, and the non-aqueous electrolyte, constituting non-aqueous electrolyte secondary battery 10, will be described in detail, and in particular, the positive electrode active material included in a positive electrode mixture layer 31 forming positive electrode 11 will be described in detail.

[Positive Electrode]

A positive electrode 11 has a positive electrode current collector 30 and a positive electrode mixture layer 31 formed on a surface of positive electrode current collector 30. Positive electrode mixture layer 31 may be formed on both surfaces of positive electrode current collector 30. As a material of positive electrode current collector 30, for example, a foil of a metal such as stainless steel, aluminum, an aluminum alloy, or titanium, and a film or the like in which the metal is arranged on the surface layer, can be used. Positive electrode current collector 30 may further comprise a protective layer including inorganic particles and a binder.

Positive electrode mixture layer 31 includes the positive electrode active material, a conductive agent, and a binder. A thickness of positive electrode mixture layer 31 is, for example, 10 μm to 150 μm. Positive electrode mixture layer 31 can be formed by coating a surface of positive electrode current collector 30 with a positive electrode mixture slurry followed by drying and compression. The positive electrode mixture slurry includes, for example, the conductive agent, the binder, the positive electrode active material, and a dispersion medium. The positive electrode mixture slurry can be mixed with the positive electrode active material after a conductive agent paste including the conductive agent, binder and dispersion medium is prepared. The positive electrode mixture slurry and the conductive agent paste may include a dispersant.

The conductive agent included in positive electrode mixture layer 31 includes, for example, carbon powder such as carbon black, acetylene black, Ketjen black, graphite, and carbon nanotubes. They may be used singly or in combination of two or more types. The binder included in positive electrode mixture layer 31 includes, for example, a fluoropolymer and a rubber-based polymer. The fluoropolymer includes, for example, polytetrafluoroethylene (PTFE), polyvinylidene difluoride (PVdF), or modified polymers thereof, and the rubber-based polymer includes, for example, an ethylene-propylene-isoprene copolymer, and an ethylene-propylene-butadiene copolymer. They can be used alone or in combination of two or more types. The dispersion medium of the positive electrode mixture slurry is, for example, N-methyl-2-pyrrolidone (NMP).

The positive electrode active material included in positive electrode mixture layer 31 includes a lithium transition metal composite oxide containing 85 mol % or more of Ni and 1 mol % or more and 15 mol % or less of Al, and having a total content of Ni, Al, and Mn of 99.9 mol % or more, with respect to a total number of moles of metal elements excluding Li. Since the Ni content is high, a battery having a high capacity can be obtained. Moreover, since the total content of Ni, Al, and Mn is 99.9 mol % or more, occupying almost entire content, the lithium transition metal composite oxide includes only 0.1 mol % or less of Co with respect to the total number of moles of metal elements excluding Li, and therefore it may be substantially free of Co. Here, being substantially free of Co refers to including only 0.01 mol % or less of Co.

A density of the positive electrode active material in positive electrode mixture layer 31 is 3.45 g/cm$^3$ or more. As described above, positive electrode mixture layer 31 formed on a surface of positive electrode current collector 30 is compressed by a rolling roller or the like, in order to increase an energy density. By compressing positive electrode mixture layer 31, cracks may occur in the lithium transition metal composite oxide.

When observing a cross section of the positive electrode with a scanning electron microscope (SEM), a proportion of the cross sectional area of the lithium transition metal composite oxide without cracks to the cross sectional area of the lithium transition metal composite oxide exposed on the cross section (hereinafter, may be referred to as an area ratio of crack-free particles) is 51% or more. In this case, the observation magnification by SEM may be 700 times, and the observation area may be about 20,000 μm$^2$. Further, here, the crack refers to a crack having a length of 3 μm or larger that can be visually observed when observing by SEM at the above magnification. The lithium transition metal composite oxide having the aforementioned composition can increase the lithium transition metal composite oxide without cracks. As a result, the battery resistance can be reduced while inhibiting a decrease in battery capacity accompanying charge/discharge of a secondary battery.

Figure 2:
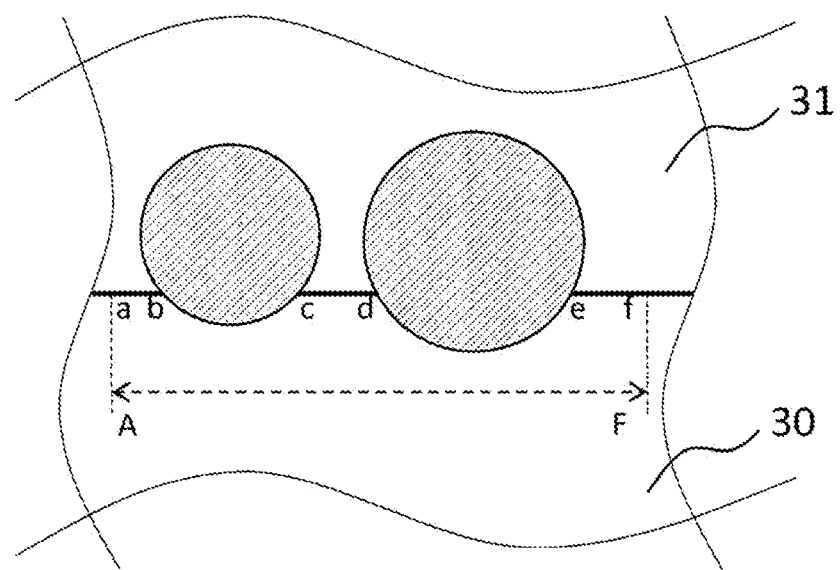
FIG. 2 is a schematically illustrated view of the vicinity of interface between the positive electrode current collector and the positive electrode mixture layer in the cross section of the positive electrode according to an example of an embodiment.

Further, by compressing positive electrode mixture layer 31, the lithium transition metal composite oxide included in positive electrode mixture layer 31 bites into a surface of positive electrode current collector 30, and the surface of positive electrode current collector 30 in contact with positive electrode mixture layer 31 may form a concave shape. The lithium transition metal complex oxide biting into positive electrode current collector 30, expands a contact area between the lithium transition metal complex oxide and positive electrode current collector 30, enabling to reduce the battery resistance. In observing the cross section of positive electrode 11 by SEM, the length of the surface of positive electrode current collector 30 in contact with positive electrode mixture layer 31 may be 1.32 times or more the straight line length of the corresponding portion. For example, in FIG. 2 illustrating the vicinity of the interface between positive electrode current collector 30 and positive electrode mixture layer 31 in the cross section of positive electrode 11, the length of the surface of positive electrode current collector 30 in contact with positive electrode mixture layer 31 is a total length of straight line a-b, curve b-c, straight line c-d, curve d-e, and straight line e-f, and the straight line length of the corresponding portion is straight line A-F, indicated by the virtual line arrow. In the cross section, the length of the surface of positive electrode current collector 30 in contact with positive electrode mixture layer 31 is longer than the straight line length of the corresponding portion due to the concave portion. FIG. 2 is a schematically illustrated view of the cross section of positive electrode 11, and the observation magnification by SEM may be 700×, and the measured length in the cross section may be about 200 μm.

The lithium transition metal composite oxide has a layered structure. The layered structure of the lithium transition metal composite oxide includes, for example, a layered structure belonging to a space group R-3m, and a layered structure belonging to a space group C2/m. Among them, the layered structure belonging to the space group R-3m is preferred in terms of increasing capacity, stability of crystal structure, etc.

The lithium transition metal composite oxide can be a composite oxide represented by the formula: $Li_aNi_xAl_yMn_zM_vNb_wO_2$ wherein in the formula, $0.9<a<1.1$, $x≥0.85$, $0.01≤y≤0.15$, $0≤z≤0.14$, $0≤v≤0.001$, $0≤w≤0.005$, $0<0.05$, $x+y+z+v+w=1$, and M is at least one element selected from Co, Fe, Ti, Si, Zr, Mo and Zn. The positive electrode active material may include a lithium transition metal composite oxide other than that represented by the above formula, or another compound, as long as the object of the present disclosure is not impaired. Molar fractions of the metal elements included in the entire particle of the lithium transition metal composite oxide are measured by inductively coupled plasma (ICP) emission spectroscopy.

The subscript a denoting a proportion of Li in the lithium transition metal composite oxide preferably satisfies $0.9≤1.1$ and more preferably $0.97≤a≤0.03$. When a is less than 0.9, the battery capacity may be decreased as compared with the case where a satisfies the above range. When a is 1.1 or more, a larger amount of Li compound is to be added as compared with the case where a satisfies the above range, which may not be economical from the viewpoint of production cost.

The subscript y denoting a proportion of Al to the total number of moles of metal elements excluding Li in lithium transition metal composite oxide, preferably satisfies $0.01≤0.15$ and more preferably $0.01≤y≤0.07$. Since Al does not change in oxidation number even during charge/discharge, inclusion of Al in the transition metal layer is presumed to stabilize the structure of the transition metal layer. When $y>0.15$, on the other hand, Al impurities are generated, lowering the battery capacity. Al may be uniformly dispersed, for example, in a layered structure of the lithium transition metal composite oxide, or else may be present in a portion of the layered structure.

Mn is an optional component. The subscript z denoting a proportion of Mn to the total number of moles of metal elements excluding Li in the lithium transition metal composite oxide, preferably satisfies $0≤z≤0.14$, and more preferably $0≤z≤0.05$.

It is preferable that $y>z$ is satisfied. This improves the charge/discharge cycle characteristics.

Nb and M (M is at least one element selected from the group consisting of Co, Fe, Ti, Si, Zr, Mo and Zn) are optional components. The subscript w denoting a proportion of Nb to the total number of moles of metal elements excluding Li in lithium transition metal composite oxide preferably satisfies $0≤w≤0.005$ and more preferably $0.001≤w≤0.005$. Including Nb in this range improves a charge/discharge efficiency of a battery. In addition, the subscript v denoting a proportion of M to the total number of moles of metal elements excluding Li in the lithium transition metal composite oxide preferably satisfies $0≤v≤0.001$.

The lithium transition metal composite oxide is, for example, a secondary particle formed by aggregating a plurality of primary particles. The particle size of the primary particle constituting the secondary particle is, for example, 0.02 μm to 2 μm. The particle size of the primary particle is measured as a diameter of a circumscribed circle in the particle image observed by SEM.

The lithium transition metal composite oxide is a particle having a volume-based median diameter (D50) of, for example, 2 μm to 30 μm, preferably 2 μm to 20 μm, and more preferably 6 μm to 15 μm. D50 refers to a particle size in which a cumulative frequency is 50% from the smallest particle size in a volume-based particle size distribution, and is also called a median diameter. The particle size distribution of the lithium transition metal composite oxide can be measured by using a laser diffraction type particle size distribution measuring apparatus (for example, MT3000II manufactured by MicrotracBEL Corp.) and water as a dispersion medium.

A content of the lithium transition metal composite oxide in the positive electrode active material is preferably 90% by mass or more, and more preferably 99% by mass or more relative to the total mass of the positive electrode active material in terms of, for example, improving the capacity of the battery and effectively inhibiting deterioration of charge/discharge cycle characteristics.

Further, the positive electrode active material of the present embodiment may include other lithium transition metal composite oxide in addition to the lithium transition metal composite oxide of the present embodiment. Other lithium transition metal composite oxide includes, for example, a lithium transition metal composite oxide having a Ni content of 0 mol % or more and less than 85 mol %.

Next, an example of a method for producing the lithium transition metal composite oxide will be described.

The method for producing a positive electrode active material comprises, for example, a first step of obtaining a composite oxide including Ni, Al and an arbitrary metal element, a second step of mixing the composite oxide obtained in the first step and a lithium compound to obtain a mixture, and a third step of calcinating the mixture.

In the first step, for example, while stirring a solution of metal salts including Ni, Al and an arbitrary metal element (Mn, Fe or the like), an alkaline solution such as sodium hydroxide is added dropwise, and the pH is adjusted to the alkaline side (for example, 8.5 to 12.5) to precipitate (co-precipitate) a composite hydroxide including Ni, Al and the arbitrary metal element, and then the composite hydroxide is calcinated to obtain a composite oxide including Ni, Al and the arbitrary metal element. The calcination temperature is not particularly limited, but is, for example, in the range of 300° C. to 600° C.

In the second step, the composite oxide obtained in the first step is mixed with a lithium compound to obtain a mixture. The lithium compound includes, for example, $Li_2CO_3$, LiOH, $Li_2O_2$, $Li_2O$, $LiNO_3$, $LiNO_2$, $Li_2SO_4$, $LiORH_2O$, LiH and LiF. Moreover, a niobium compound may also be further mixed. Examples of the niobium compound includes $Nb_2O_5$, $Nb_2O_5 \cdot nH_2O$, $LiNbO_3$, and $NbCl_5$. A mixing proportion of the composite oxide above, the Li compound, and the Nb compound can be determined as appropriate so as to be a desired proportion of each element in the Li transition metal oxide to be finally obtained. A molar ratio of Li relative to metal elements excluding Li is, for example, 0.9 mol % or more and 1.1 mol % or less and preferably 0.95 or more and 1.05 or less. Moreover, when Nb is added, a molar ratio of Nb relative to metal elements excluding Li is, for example, 0.005 mol % or less and preferably 0.001 mol % or more and 0.005 mol % or less. In the second step, when mixing the composite oxide obtained in the first step, the lithium compound, some other metal raw material may be added if necessary. The other metal raw material is an oxide or the like including a metal element other than the metal elements constituting the composite oxide obtained in the first step.

In the third step, the mixture obtained in the second step is calcinated under an oxygen atmosphere to obtain the lithium transition metal composite oxide according to the present embodiment. In the third step, the rate of temperature rise at 450° C. or higher and 680° C. or lower, is higher than 1.0° C./min and 5.5° C./min or lower, and the maximum temperature reached is in the range of 700° C. or higher and 850° C. or lower. The rate of temperature rise from above 680° C. to the maximum temperature reached is, for example, 0.1 to 3.5° C./min. Moreover, a holding time at the maximum temperature reached is 1 hour or longer and 10 hours or shorter. Further, the third step may be a multi-step calcination, and a plurality of the first rates of temperature rise and the second rates of temperature rise may be set for each temperature region provided that they are within the aforementioned specified ranges, respectively.

In the method for producing the present embodiment, the lithium metal composite oxide powder may be washed with water after the third step in order to improve the battery capacity and safety. This washing with water may be carried out by a publicly known method and conditions and may be carried out within a range in which lithium is eluted from the lithium metal composite oxide and battery characteristics are not deteriorated. Further, a tungsten compound may be mixed before and after this washing with water. This tungsten compound is, for example, tungsten oxide, lithium tungstate, and ammonium tungstate. When having mixed after washing with water, either method may be employed, i.e., the mixture may be mixed after dried, or may be mixed only by solid-liquid separation without drying.

[Negative Electrode]

A negative electrode 12 has a negative electrode current collector 40 and a negative electrode mixture layer 41 formed on a surface of negative electrode current collector 40. Negative electrode mixture layer 41 may be formed on both surfaces of negative electrode current collector 40. Negative electrode current collector 40 that is a non-porous conductive substrate (metal foil or the like) or a porous conductive substrate (mesh body, net body, punching sheet or the like), can be used. Further, a film or the like in which the metal is arranged on the surface, can be used. As materials of the negative electrode current collector, stainless steel, nickel, a nickel alloy, copper, a copper alloy, etc., can be exemplified. A thickness of the negative electrode current collector is not particularly limited, and may be, for example, 1 to 50 μm and may be 5 to 20 μm.

Negative electrode mixture layer 41 includes a negative electrode active material, a conductive agent, a thickener, and a binder. A thickness of negative electrode mixture layer 41 is, for example, 10 μm to 150 μm on one side of negative electrode current collector 40. Negative electrode mixture layer 41 can be formed by coating a surface of negative electrode current collector 40 with a negative electrode mixture slurry and drying the coating film. The dried coating film may be rolled if necessary. The negative electrode mixture slurry includes, for example, the conductive agent, the binder, the thickener, the negative electrode active material, and the dispersion medium. A surface of negative electrode current collector 40 may be coated with a first negative electrode slurry, a coating film of the first negative electrode slurry may be coated thereon with a second negative electrode slurry, and a coating film of the first negative electrode slurry and the second negative electrode slurry may be dried.

The negative electrode active material is not particularly limited as long as it is a material capable of intercalating and de-intercalating lithium ions, and includes, for example, a carbon material, a metal capable of forming an alloy with lithium, or an alloy compound including the metal. Further, a mixture of the carbon material and the alloy compound or the like, can be used. In addition to the aforementioned materials, a material such as lithium titanate having a higher charge/discharge potential vs. metallic lithium than a carbon material or the like can also be used. A ratio of a mass of the carbon material included in the negative electrode active material layer to a mass of the alloy compound included in the negative electrode active material layer may be, for example, 1 to 99 or may also be 4 to 99.

As the carbon materials, natural graphite, non-graphitizable carbon, graphites such as artificial graphite, cokes, etc., can be used. As the carbon material, one type thereof may be used singly, or two or more types may be combined for use. When graphite particles are used as the carbon material, a graphite-based material conventionally used as a negative electrode active material for non-aqueous electrolyte secondary batteries may be used, for example, natural graphite such as massive graphite and earthy graphite as well as artificial graphite such as massive artificial graphite and graphitized mesophase carbon microbeads, can be used. A BET specific surface area of graphite particles may be 0.1 $m^2/g$ or larger, or 1 $m^2/g$ or larger.

As the alloy compound, a compound including at least one type of metal capable of forming an alloy with lithium is included. As an element capable of forming the alloy with lithium, a silicon-containing material using silicon or a tin-containing material using tin can be used. Silicon oxide, tin oxide, etc., which are bonded with oxygen, can also be used. The alloy compound may be in the form of particles or may be directly bonded to the current collector. When it is a particulate form, a particle size thereof may be about 1 μm to 20 μm.

As the silicon-containing material, for example, a lithium ion conductive phase and silicon composite particles in which silicon particles are dispersed in the lithium ion conductive phase, can be used. As the lithium ion conductive phase, for example, a silicon oxide phase, a silicate phase and/or a carbon phase can be used. The main component of the silicon oxide phase (for example, 95% by mass to 100% by mass) can be silicon dioxide.

The silicate phase may include, for example, at least one selected from the group consisting of Group I elements and Group II elements in the long-periodic table. As the Group I element of the long-periodic table and the Group II element of the long-periodic table include, for example, lithium (Li), potassium (K), sodium (Na), magnesium (Mg), calcium (Ca), strontium (Sr), and barium (Ba), may be used. As other elements, aluminum (Al), boron (B), lanthanum (La), phosphorus (P), zirconium (Zr), titanium (Ti), iron (Fe), chromium (Cr), and nickel (Ni), may be included. Among them, a silicate phase including lithium (hereinafter, may be referred to as a lithium silicate phase) is preferable because an irreversible capacity is small, and an initial charge/discharge efficiency is high.

The lithium silicate phase may be an oxide phase including lithium (Li), silicon (Si), and oxygen (O), and may also include other elements. An atomic ratio of 0 to Si in lithium silicate phase: O/Si is, for example, greater than 2 and less than 4. Preferably, 0/Si is greater than 2 and less than 3. An atomic ratio of Li to Si in lithium silicate phase: Li/Si is, for example, greater than 0 and less than 4. The lithium silicate phase can have a composition represented by the formula: $Li_{2z}SiO_{2+z}$ (0<z<2). The subscript z preferably satisfies the relationship of 0<z<1, and more preferably z=½. As elements excluding Li, Si, and O that can be included in the lithium silicate phase, for example, iron (Fe), chromium (Cr), nickel (Ni), manganese (Mn), copper (Cu), and molybdenum (Mo), Zinc (Zn), aluminum (Al), and zirconium (Zr), are included.

Negative electrode 12 preferably includes an oxide phase including silicon dioxide as well as at least Li, Si, and O.

The carbon phase may be formed of, for example, amorphous carbon having low crystallinity (i.e., amorphous carbon). The amorphous carbon may be, for example, hard carbon, soft carbon, or other carbon.

As the conductive agents included in negative electrode mixture layer 41, carbon black such as acetylene black, carbon nanotubes, metal fibers, carbon fluoride, metal powder, conductive whiskers such as zinc oxide and potassium titanate, conductive metal oxides such as titanium oxide and graphene, organic conductive materials such as phenylene derivatives, etc., can be exemplified. One type thereof may be used singly, and two or more types may be combined for use.

As the thickeners included in negative electrode mixture layer 41, carboxymethyl cellulose (CMC) and modified products thereof (including salts such as a Na salt), and cellulose derivatives such as methyl cellulose (cellulose ether or the like); saponified polymers having vinyl acetate units such as polyvinyl alcohol; polyethers (polyalkylene oxide such as polyethylene oxide), etc., are included. One type thereof may be used alone, or two or more may be used in combination.

Examples of the binder included in negative electrode mixture layer 41 may include resin materials, for example, fluororesins such as polytetrafluoroethylene and polyvinylidene difluoride (PVDF); polyolefin resins such as polyethylene and polypropylene; polyamide resins such as an aramid resin; polyimide resins such as polyimide and polyamideimide; acrylic resins such as polyacrylic acid, methyl polyacrylate, and an ethylene-acrylic acid copolymer; vinyl resins such as polyacrylonitrile and polyvinyl acetate; polyvinylpyrrolidone; polyethersulfone; and rubber-like materials such as styrene-butadiene copolymerized rubber (SBR). They can be used alone or in combination of two or more. As a polyacrylic acid salt, a Li salt or Na salt is preferably used. Among them, a cross-linked lithium polyacrylate can be preferably used.

[Separator]

Separator 13 that is, for example, a porous sheet having ion permeability and insulating property, is used. Specific examples of the porous sheet include a microporous thin membrane, a woven fabric, and a non-woven fabric. As a material of the separator, an olefinic resin such as polyethylene (PE) or polypropylene (PP), cellulose, or the like is suitable. The separator may be a laminate having a cellulose fiber layer and a thermoplastic resin fiber layer such as an olefinic resin. The laminate can be a laminate of polyolefin resin and cellulose fiber layer or may also be a PE/PP bilayer structure in which different polyolefin resins are laminated, or a three-layer structure of PE/PP/PE.

[Nonaqueous Electrolyte]

The nonaqueous electrolyte includes a non-aqueous solvent and an electrolyte salt dissolved in the non-aqueous solvent. The non-aqueous electrolyte may be in liquid form or in gel form. The liquid non-aqueous electrolyte (non-aqueous electrolytic solution) is prepared by dissolving the electrolyte salt in a non-aqueous solvent. The gel-like non-aqueous electrolyte may be a solid electrolyte including the non-aqueous electrolytic solution and a matrix polymer. As the matrix polymer, for example, a polymer material that absorbs a solvent to form a gel is used. Such polymer materials include fluororesins, acrylic resins, and/or polyether resins, etc.

As the non-aqueous solvent, for example, an ester, an ether, a nitrile, an amide such as dimethylformamide, or a mixed solvent of two or more of them can be used. The non-aqueous solvent may include a halogen substituent in which at least a portion of hydrogen in the solvent is substituted with a halogen atom such as fluorine. One type of non-aqueous solvent may be used alone, or two or more may be combined for use. Amounts of these non-aqueous solvents in the non-aqueous electrolytic solution are, for example, 5 to 100% by mass.

Examples of the aforementioned esters include cyclic carbonate esters (excluding unsaturated cyclic carbonates described below), chain carbonate esters, cyclic carboxylic acid esters, and chain carboxylic acid esters. The cyclic carbonate esters include propylene carbonate (PC), ethylene carbonate (EC), butylene carbonate, etc. The chain carbonate esters include diethyl carbonate (DEC), ethyl methyl carbonate (EMC), dimethyl carbonate (DMC), methyl propyl carbonate, ethyl propyl carbonate, methyl isopropyl carbonate, etc. The cyclic carboxylic acid esters include γ-butyrolactone (GBL), γ-valerolactone (GVL), etc. The chain carboxylic acid ester includes methyl formate, ethyl formate, propyl formate, methyl acetate, ethyl acetate, propyl acetate, methyl propionate, ethyl propionate, propyl propionate, methyl pivalate, etc.

Examples of the aforementioned ethers include cyclic ethers and chain ethers. Examples of the cyclic ethers include 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ether. The chain ether includes 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, tetraethylene glycol dimethyl ether, etc.

Examples of the aforementioned nitriles include acetonitrile, propionitrile, butylnitrile, valeronitrile, n-heptanenitrile, succinonitrile, glutaronitrile, adiponitrile, pimelonitrile, 1,2,3-propane tricarbonyl, and 1,3,5-pentane tricarbonitrile.

Examples of the aforementioned halogen substituents include fluorinated ethers, fluorinated cyclic carbonates, fluorinated chain carbonates, and fluorinated chain carboxylic acid esters such as methyl fluoropropionate (FMP). The fluorinated ether includes 2,2,2-trifluoroethylmethyl ether, 1,1,2,2-tetrafluoroethyl-2,2,2-trifuoroethyl, etc. The fluorinated cyclic carbonate includes 4-fluoroethylene carbonate (FEC), 4,5-difluoroethylene carbonate, 4,4-difluoroethylene carbonate, 4,4,5-trifluoroethylene carbonate, 4,4,5,5-tetrafluoroethylene carbonate, etc. The fluorinated chain carboxylic acid ester includes fluorinated ethyl propionate, fluorinated methyl acetate, fluorinated ethyl acetate, fluorinated propyl acetate, ethyl 2,2,2-trifluoroacetate, methyl 3,3,3-trifluoropropionate, methyl pentafluoropropionate, etc.

The electrolyte salt that is a lithium salt or the like can be used. A concentration of the lithium salt in the non-aqueous electrolyte is, for example, 0.5 to 3 mol/L, and 0.8 to 1.5 mol/L is preferred.

The lithium salt includes, for example, $LiClO_4$, $LiBF_4$, $LiPF_6$, $LiAlCl_4$, $LiSbF_6$, $LiSCN$, $LiCF_3SO_3$, $LiCF_3CO_2$, $LiAsF_6$, $LiB_{10}Cl_{10}$, a lithium lower aliphatic carboxylate, LiCl, LiBr, LiI, $Li(P(C_2O_4)F_4)$, $LiPF_{6-x}(C_nF_{2n+1})_x$ ($1<x<6$, n is 1 or 2), lithium chloroborane, borates, phosphates, and imide salts. The borates include $Li[B(C_2O_4)_2]$, $Li[B(C_2O_4)F_2]$, $Li_2B_4O_7$, lithium bis(1,2-benzenediolato(2-)-O,O') borate, lithium bis(2,3-naphthalenediolato(2-)-O,O') borate, lithium bis(2,2'-biphenyldiolato(2-)-O,O') borate, lithium bis(5-fluoro-2-olato-1-benzenesulfonic acid-O,O') borate, etc. The phosphates include $Li[P(C_2O_4)F_4]$, $Li[P(C_2O_4)_2F_2]$, $Li[P(C_2O_4)_3]$, etc. The imide salts include lithium bis(fluorosulfonyl)imide ($LiN(FSO_2)_2$: hereinafter referred to as LiFSI), lithium bis(trifluoromethanesulfonyl)imide ($LiN(CF_3SO_2)_2$), lithium (trifluoromethanesulfonyl)(nonafluorobutanesulfonyl)imide ($LiN(CF_3SO_2)(C_4F_9SO_2)$), lithium bis(pentafluoroethanesulfonyl)imide ($LiN(C_2F_5SO_2)_2$), $LiN(C_lF_{2l+1}SO_2)(C_mF_{2m+1}SO_2)$ {l and m are integers of 0 or larger}, etc. One type of lithium salt may be used alone, or two or more may be used in combination.

The electrolyte salt is preferably combined for use with $LiPF_6$ and LiFSI. A concentration of LiFSI in an electrolytic solution is preferably 0.1 mol/L or more and 1.0 mol/L or less. A concentration of $LiPF_6$ in the electrolytic solution is preferably 0.5 mol/L or more and 1.5 mol/L or less. A total concentration of LiFSI and $LiPF_6$ in the electrolytic solution is preferably 1 mol/L or more and 2 mol/L or less. When the LiFSI and $LiPF_6$ having the aforementioned concentrations are combined for use, the effects of the LiFSI and $LiPF_6$ above having a favorable effect balance thereof can be obtained, further enhancing the initial charge/discharge efficiency of the battery.

The electrolytic solution may also include additives. Amounts of these additives in the non-aqueous electrolyte are, for example, 0.01 to 20% by mass. The additive includes unsaturated carbonates, acid anhydrides, phenolic compounds, benzene compounds, nitrile compounds, isocyanate compounds, sultone compounds, sulfuric acid compounds, borate ester compounds, phosphate ester compounds, phosphite ester compounds, etc.

Unsaturated cyclic carbonate includes, for example, vinylene carbonate, 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinyl ethylene carbonate, and divinyl ethylene carbonate. One type of unsaturated cyclic carbonate may be used alone, or two or more may be used in combination. The hydrogen atoms of the unsaturated cyclic carbonate may be partially substituted with fluorine atoms.

The acid anhydride may be an anhydride in which a plurality of carboxylic acid molecules is condensed intermolecularly, but it is preferably an acid anhydride of a polycarboxylic acid. The acid anhydride of the polycarboxylic acid includes, for example, succinic anhydride, maleic anhydride, and phthalic anhydride.

As the phenolic compounds, for example, phenol and hydroxytoluene are included.

As the benzene compounds, fluorobenzene, hexafluorobenzene, cyclohexylbenzene (CHB), etc., are included.

As the nitrile compounds, adiponitrile, pimelonitrile, propionitrile, succinonitrile, etc., are included.

As the isocyanate compounds, methyl isocyanate (MIC), diphenylmethane diisocyanate (MDI), hexamethylene diisocyanate (HDI), toluene diisocyanate (TDI), isophorone diisocyanate (IPDI), bisisocyanate methylcyclohexane (BIMCH), etc., are included.

As the sultone compounds, propane sultone, propene sultone, etc., are included.

As the sulfuric acid compounds, ethylene sulfate, ethylene sulfite, dimethyl sulfate, lithium fluorosulfate, etc., are included.

As the borate ester compounds, trimethylborate, tris(trimethylsilyl)borate, etc., are included.

As the phosphate ester compounds, trimethylphosphate, tris(trimethylsilyl)phosphate, etc., are included.

As the phosphite ester compounds, trimethylphosphite, tris(trimethylsilyl)phosphite, etc., are included.

The non-aqueous electrolyte preferably includes the non-aqueous solvent, the electrolyte salt, and the additive, and the additive preferably includes 1% by mass to 5% by mass of vinylene carbonate and 5% by mass to 15% by mass of fluoroethylene carbonate, with respect to a total mass of the non-aqueous solvent and electrolyte salt.

EXAMPLES

The present disclosure will be further described below with reference to Examples and Comparative Examples, but the present disclosure is not limited to the following Examples.

[Production of Positive Electrode Active Material]

Example 1

A composite hydroxide represented by $[Ni_{0.92}Al_{0.05}Mn_{0.03}](OH)_2$ obtained by the co-precipitation method was calcinated at 500° C. for 8 hours to obtain a composite oxide ($Ni_{0.92}Al_{0.05}Mn_{0.03}O_2$). LiOH and the above composite oxide were mixed so that the molar ratio of Li and the total amount of Ni, Al and Mn was 1.03:1, to obtain a mixture. After the mixture was raised from room temperature to 650° C. under an oxygen stream at a rate of temperature rise of 2.0° C./min, it was calcinated by raising the temperature from 650° C. to 730° C. at a rate of temperature rise of 0.5° C./min to obtain a calcinated product. The calcined product was washed with water, and after solid-liquid separation, tungsten oxide was mixed to 0.01 mol % of the total molar amount of Ni, Al, and Mn in the calcined product, and then the mixture was dried to obtain a lithium transition metal compound. As a result of measuring the composition of the obtained positive electrode active material by using an ICP emission spectroscopic analyzer (trade name "iCAP6300", manufactured by Thermo Fisher Scientific Inc.), the composition was found to be $LiNi_{0.92}Al_{0.05}Mn_{0.03}O_2$. This was used as the positive electrode active material of Example 1.

Example 2

A positive electrode active material was obtained in the same manner as in Example 1 except that the composite hydroxide represented by $[Ni_{0.91}Al_{0.06}Mn_{0.03}](OH)_2$ was used to obtain the composite oxide ($Ni_{0.91}Al_{0.06}Mn_{0.03}O_2$), and a mixture was obtained by mixing LiOH and the above composite oxide so that the molar ratio of Li and the total amount of Ni, Al, and Mn was 1.03:1. The composition of the obtained positive electrode active material was $LiNi_{0.91}Al_{0.06}Mn_{0.03}O_2$. This was used as the positive electrode active material of Example 2.

Example 3

A positive electrode active material was obtained in the same manner as in Example 1 except that the composite hydroxide represented by $[Ni_{0.92}Al_{0.05}Mn_{0.03}](OH)_2$ was used to obtain the composite oxide ($Ni_{0.92}Al_{0.05}Mn_{0.03}O_2$), and a mixture was obtained by mixing LiOH, the above composite oxide, and $Nb_2O_5$ so that the molar ratio of Li, the total amount of Ni, Al, and Mn, and Nb was 1.03:1:0.002. The composition of the obtained positive electrode active material was $LiNi_{0.92}Al_{0.05}Mn_{0.03}Nb_{0.002}O_2$. This was used as the positive electrode active material of Example 3.

Example 4

A positive electrode active material was obtained in the same manner as in Example 1 except that the composite hydroxide represented by $[Ni_{0.91}Al_{0.06}Mn_{0.03}](OH)_2$ was used to obtain the composite oxide ($Ni_{0.91}Al_{0.06}Mn_{0.03}O_2$), and a mixture was obtained by mixing LiOH, the above composite oxide, and $Nb_2O_5$ so that the molar ratio of Li, the total amount of Ni, Al, and Mn, and Nb was 1.03:1:0.002. The composition of the obtained positive electrode active material was $LiNi_{0.91}Al_{0.06}Mn_{0.03}Nb_{0.002}O_2$. This was used as the positive electrode active material of Example 4.

Example 5

A positive electrode active material was obtained in the same manner as in Example 1 except that the composite hydroxide represented by $[Ni_{0.94}Al_{0.06}](OH)_2$ was used to obtain the composite oxide ($Ni_{0.94}Al_{0.06}O_2$), and a mixture was obtained by mixing LiOH and the above composite oxide so that the molar ratio of Li and the total amount of Ni and Al was 1.03:1. The composition of the obtained positive electrode active material was $LiNi_{0.94}Al_{0.06}O_2$. This was used as the positive electrode active material of Example 5.

Comparative Example

A positive electrode active material was obtained in the same manner as in Example 1 except that the composite hydroxide represented by $[Ni_{0.80}Mn_{0.20}](OH)_2$ was used to obtain the composite oxide ($Ni_{0.80}Mn_{0.20}O_2$), and a mixture was obtained by mixing LiOH and the above composite oxide so that the molar ratio of Li and the total amount of Ni and Mn was 1.03:1. The composition of the obtained positive electrode active material was $LiNi_{0.80}Mn_{0.20}O_2$. This was used as the positive electrode active material of Comparative Example.

Reference Example

A positive electrode active material was obtained in the same manner as in Example 1 except that the composite hydroxide represented by $[Ni_{0.91}Co_{0.05}Al_{0.04}](OH)_2$ was used to obtain the composite oxide ($Ni_{0.91}Co_{0.05}Al_{0.04}O_2$), and a mixture was obtained by mixing LiOH and the above composite oxide so that the molar ratio of Li and the total amount of Ni, Co, and Al was 1.03:1. The composition of the obtained positive electrode active material was $LiNi_{0.91}Co_{0.05}Al_{0.04}O_2$. This was used as the positive electrode active material of Reference Example.

Next, by using the positive electrode active materials of Examples 1 to 5, Comparative Example, and Reference Example, test cells were fabricated as follows.

[Fabrication of Positive Electrode]

91 parts by mass of the positive electrode active material of each of Examples 1 to 5, Comparative Example, and Reference Example, 7 parts by mass of acetylene black as a conductive agent, and 2 parts by mass of polyvinylidene fluoride as a binder were mixed to prepare a positive electrode mixture slurry by mixing with N-methyl-2-pyrrolidone (NMP). Next, a positive electrode current collector made of aluminum foil having a thickness of 15 μm was coated with the slurry and the coating film was dried, then rolled by a rolling roller, and cut into a predetermined electrode size to obtain a positive electrode in which positive electrode mixture layers were formed on both sides of the positive electrode current collector. It is noted that an exposed portion of the positive electrode current collector with the surface exposed was arranged on a portion of the positive electrode. Positive electrodes of Examples 2 to 5, Comparative Example, and Reference Example were fabricated in the same manner. All the positive electrodes had the densities of the positive electrode active materials of 3.6 g/cm$^3$ in the positive electrode mixture layers.

[Fabrication of Negative Electrode]

Natural graphite was used as a negative electrode active material. A negative electrode active material, sodium carboxymethyl cellulose (CMC-Na), and styrene-butadiene rubber (SBR) were mixed in an aqueous solution at a solid content mass ratio of 100:1:1 to prepare a negative electrode mixture slurry. Both sides of the negative electrode current collector made of copper foil were coated with the negative electrode mixture slurry, and the coating film was dried, rolled using a rolling roller, and cut to a predetermined electrode size to obtain a negative electrode in which negative electrode mixture layers were formed on both sides of the negative electrode current collector. It is noted that an exposed portion of the negative electrode current collector with the surface exposed was arranged in a portion of the negative electrode.

[Preparation of Non-Aqueous Electrolyte]

Ethylene carbonate (EC), methyl ethyl carbonate (MEC), and dimethyl carbonate (DMC) were mixed in a volume ratio of 3:3:4. A non-aqueous electrolyte was prepared by dissolving lithium hexafluorophosphate (LiPF$_6$) in the mixed solvent at a concentration of 1.2 mol/liter.

[Fabrication of Test Cell]

An aluminum lead was attached to the exposed portion of the positive electrode including the positive electrode active material of each of Examples 1 to 5, Comparative Example, and Reference Example, and a nickel lead was attached to the exposed portion of the aforementioned negative electrode, respectively, and the positive electrode and the negative electrode were swirlingly wound with a polyolefin separator interposed therebetween and press-formed in the radial direction to fabricate a flat wound electrode assembly. This electrode assembly was housed in an outer body, the aforementioned non-aqueous electrolytic solution was injected, and then an opening of the outer body was sealed to obtain a test cell.

For each test cell, evaluation of a capacity retention before and after the cycle test, and a direct current resistance of the battery was conducted. The results are shown in Table 1. Also shown in Table 1 are the compositions of the positive electrode active materials of Examples 1 to 5, Comparative Example, and Reference Example, the area ratios of crack-free particles, and each ratio of the length of the surface of the positive electrode current collector in contact with the positive electrode mixture layer to the straight line length of the corresponding portion (hereinafter may be referred to as a ratio of the surface length of the positive electrode current collector to the straight line) is also shown.

[Evaluation of Capacity Retention]

The following cycle test was carried out for the battery fabricated by incorporating the positive electrode including the positive electrode active material of each of Examples 1 to 5, Comparative Example, and Reference Example. The discharge capacity of the first cycle of the cycle test and the discharge capacity of the 100th cycle were obtained to calculate the capacity retention by the following formula.

Capacity retention (%)=(100th cycle discharge capacity÷1st cycle discharge capacity)×100

<Cycle Test>

The test cell was charged at a constant current of 0.3 It under a temperature environment of 25° C. until the battery voltage reached 4.2 V, and then charged at a constant voltage of 4.2 V until the current value reached 0.02 It. Subsequently, constant current discharge was carried out with a constant current of 0.5 It until the battery voltage fell down to 2.5 V. This charge/discharge cycle was repeated 100 cycles.

[Evaluation of Direct Current Resistance]

Under an environment of 25° C., the test cell was charged at a constant current of 0.3 It until the battery voltage reached 4.2 V and was charged at a constant voltage of 4.2 V until the current value reached 0.02 It. Subsequently, the cell was stored at 25° C. for 1 hour, and then discharged at a constant current of 0.5 It until the battery voltage fell down to 2.5 V. The direct current resistance was calculated by dividing a difference between an open circuit voltage (OCV) and a closed circuit voltage (CCV) 10 seconds after discharge, by discharge current 10 seconds after discharge, as shown in the following equation.

Direct current resistance=[OCV−CCV(10 seconds after discharge)]/discharge current(10 seconds after discharge)

TABLE 1

| | Positive electrode active material (mol %) | | | | | Area ratio of crack-free | Ratio of surface length of positive electrode current collector to | Capacity retention | Direct current |
|---|---|---|---|---|---|---|---|---|---|
| | Ni | Al | Mn | Co | Nb | particles (%) | straight line thereof (%) | (%) | resistance (mΩ) |
| Example 1 | 92 | 5 | 3 | 0 | 0 | 55.1 | 142 | 88.5 | 427 |
| Example 2 | 91 | 6 | 3 | 0 | 0 | 53.6 | 138 | 91.1 | 360 |
| Example 3 | 92 | 5 | 3 | 0 | 0.2 | 55.9 | 144 | 89.9 | 384 |
| Example 4 | 91 | 6 | 3 | 0 | 0.2 | 54.6 | 140 | 90.4 | 420 |

TABLE 1-continued

|  | Positive electrode active material (mol %) | | | | | Area ratio of crack-free particles (%) | Ratio of surface length of positive electrode current collector to straight line thereof (%) | Capacity retention (%) | Direct current resistance (mΩ) |
|---|---|---|---|---|---|---|---|---|---|
|  | Ni | Al | Mn | Co | Nb |  |  |  |  |
| Example 5 | 94 | 6 | 0 | 0 | 0 | 52.9 | 137 | 87.5 | 419 |
| Comparative Example | 80 | 0 | 20 | 0 | 0 | 48.4 | 126 | 82.2 | 463 |
| Reference Example | 91 | 4 | 0 | 5 | 0 | 50.1 | 126 | 91.1 | 365 |

In Examples 1 to 5 each, the capacity retention was higher, and the direct current resistance was lower as compared with Comparative Example. Moreover, in Examples 1 to 5 each, the values of the capacity retention and the direct current resistance were substantially equivalent to those of Reference Example including Co. From these results, using the positive electrode active material that inhibits generation of cracks by adjusting the composition was found to enable inhibition of the decrease in battery capacity accompanying charge/discharge as well as enable lowering of the battery resistance to the same extent as the positive electrode active material including Co.

REFERENCE SIGNS LIST 10 non-aqueous electrolyte secondary battery
11 positive electrode
12 negative electrode
13 separator
14 electrode assembly
15 battery case
16 outer can
17 sealing assembly
18, 19 insulating plates
20 positive electrode tab
21 negative electrode tab
22 grooved portion
23 bottom plate
24 lower vent member
25 insulating member
26 upper vent member
27 cap
28 gasket
30 positive electrode current collector
31 positive electrode mixture layer
40 negative electrode current collector
41 negative electrode mixture layer

The invention claimed is:

1. A non-aqueous electrolyte secondary battery, comprising:
a positive electrode;
a negative electrode; and
a non-aqueous electrolyte, wherein
the positive electrode has a positive electrode current collector and a positive electrode mixture layer formed on a surface of the positive electrode current collector,
a positive electrode active material included in the positive electrode mixture layer includes a lithium transition metal composite oxide containing 85 mol % or more of Ni and 1 mol % or more and 15 mol % or less of Al, and having a total content of Ni, Al, and Mn of 99.9 mol % or more, with respect to a total number of moles of metal elements excluding Li, and further contains 0.5 mol % or less of Nb with respect to a total moles of metal elements excluding Li,
a density of the positive electrode active material in the positive electrode mixture layer is 3.45 g/cm$^3$ or more, and wherein
in scanning electron microscope observation of a cross section of the positive electrode, a proportion of a cross sectional area of the lithium transition metal composite oxide without cracks to a cross sectional area of the lithium transition metal composite oxide exposed in the cross section is 51% or more when an observation magnification is 700 times, and an observation area is about 20,000 μm$^2$.

2. The non-aqueous electrolyte secondary battery according to claim 1, wherein the lithium transition metal composite oxide is represented by a formula $Li_aNi_xAl_yMn_zM_vNb_wO_{2-b}$ wherein $0.9<a<1.1$, $x\geq 0.85$, $0.01\leq y\leq 0.15$, $0\leq z\leq 0.14$, $0\leq v\leq 0.001$, $0\leq w\leq 0.005$, $0\leq b<0.05$, $x+y+z+v+w=1$, and M is at least one element selected from the group consisting of Co, Fe, Ti, Si, Zr, Mo and Zn.

3. The non-aqueous electrolyte secondary battery according to claim 2, wherein in the formula representing the lithium transition metal composite oxide, $0.01\leq y\leq 0.07$ and $0\leq z\leq 0.05$.

4. The non-aqueous electrolyte secondary battery according to claim 2, wherein in the formula representing the lithium transition metal composite oxide, $y>z$.

5. The non-aqueous electrolyte secondary battery according to claim 2, wherein in the formula representing the lithium transition metal composite oxide, $0.001\leq w\leq 0.005$.

6. The non-aqueous electrolyte secondary battery according to claim 1, wherein the lithium transition metal composite oxide is substantially free of Co.

7. The non-aqueous electrolyte secondary battery according to claim 1, wherein a surface of the positive electrode current collector in contact with the positive electrode mixture layer has a concave shape, and wherein in scanning electron microscope observation of a cross section of the positive electrode, a length of the surface of the positive electrode current collector in contact with the positive electrode mixture layer is 1.32 times or more a straight line length connecting two portions that are corresponding to two ends of the length of the surface of the positive electrode current collector when the observation magnification is 700×, and the measured length in the cross section is about 200 μm.

8. The non-aqueous electrolyte secondary battery according to claim 1, wherein the non-aqueous electrolyte includes a non-aqueous solvent, an electrolyte salt, and an additive, and the additive includes 1% by mass to 5% by mass of vinylene carbonate and 5% by mass to 15% by mass of fluoroethylene carbonate with respect to a total mass of the non-aqueous solvent and the electrolyte salt.

9. The non-aqueous electrolyte secondary battery according to claim 1, wherein the negative electrode includes silicon dioxide as well as an oxide phase including at least Li, Si, and O.

* * * * *